(12) United States Patent
Bruer et al.

(10) Patent No.: US 10,051,783 B2
(45) Date of Patent: Aug. 21, 2018

(54) WHEEL ASSEMBLY FOR AN ADJUSTABLE PLANTER BAR SYSTEM

(71) Applicant: American Made Equipment Inc., Eldora, IA (US)

(72) Inventors: Dusko Bruer, Eldora, IA (US); Timothy J. Manning, Eldora, IA (US)

(73) Assignee: AMERICAN MADE EQUIPMENT INC., Eldora, IA (US)

(*) Notice: Subject to any disclaimer, the term of this patent is extended or adjusted under 35 U.S.C. 154(b) by 13 days.

(21) Appl. No.: 15/252,776

(22) Filed: Aug. 31, 2016

(65) Prior Publication Data

US 2017/0049041 A1 Feb. 23, 2017

Related U.S. Application Data

(63) Continuation-in-part of application No. 14/634,076, filed on Feb. 27, 2015.

(60) Provisional application No. 62/212,355, filed on Aug. 31, 2015, provisional application No. 61/946,453, filed on Feb. 28, 2014.

(51) Int. Cl.
| | |
|---|---|
| *A01C 7/20* | (2006.01) |
| *A01B 15/14* | (2006.01) |
| *A01B 39/22* | (2006.01) |
| *A01B 63/00* | (2006.01) |

(52) U.S. Cl.
CPC .............. *A01C 7/208* (2013.01); *A01B 15/14* (2013.01); *A01B 39/22* (2013.01); *A01B 63/004* (2013.01); *A01B 63/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,228,860 | A * | 10/1980 | Orthman | A01L 369/004 172/190 |
| 4,251,014 | A * | 2/1981 | Salley | A01C 19/04 111/69 |
| 4,520,876 | A * | 6/1985 | Peterson | A01B 63/163 172/26 |
| 5,476,147 | A | 12/1995 | Fixemer | |
| 6,240,860 | B1 * | 6/2001 | Forchino | A01C 7/208 111/52 |
| 6,843,186 | B2 * | 1/2005 | Shoup | A01C 7/08 111/59 |
| 8,469,114 | B1 * | 6/2013 | Borkgren | A01B 69/003 172/166 |

(Continued)

FOREIGN PATENT DOCUMENTS

| | | |
|---|---|---|
| RU | 2061349 | 6/1996 |
| RU | 2243635 | 1/2005 |

*Primary Examiner* — Alicia Torres
(74) *Attorney, Agent, or Firm* — Duane Morris LLP; J. Rodman Steele, Jr.; Gregory M. Lefkowitz

(57) ABSTRACT

A wheel assembly for a multi-row planter comprises a wheel, a connection assembly, and a piston assembly. The connection assembly has a mounting surface adapted to engage a mounting bracket for mounting to a planter bar. The a piston assembly is adapted to permit movement of the wheel assembly between a first folded position and a second extended position. The wheel assembly is slidably coupled to the planter bar such that it may be slidably positioned at any point along the full lateral length of the planter bar.

20 Claims, 14 Drawing Sheets

(56) References Cited

U.S. PATENT DOCUMENTS

2009/0007828 A1 1/2009 Johnson
2014/0048296 A1* 2/2014 Bassett ................ A01B 71/02
172/4

* cited by examiner

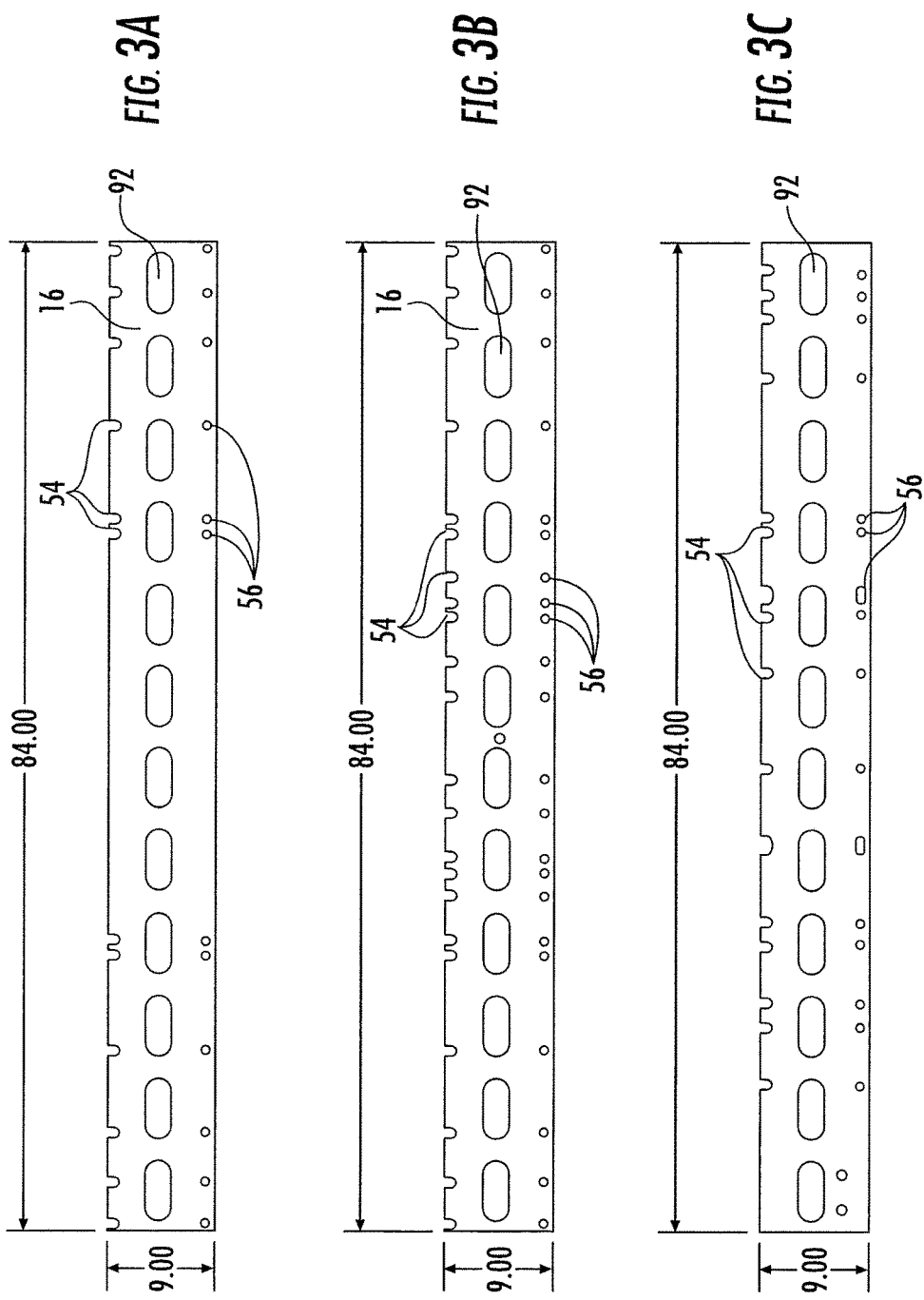

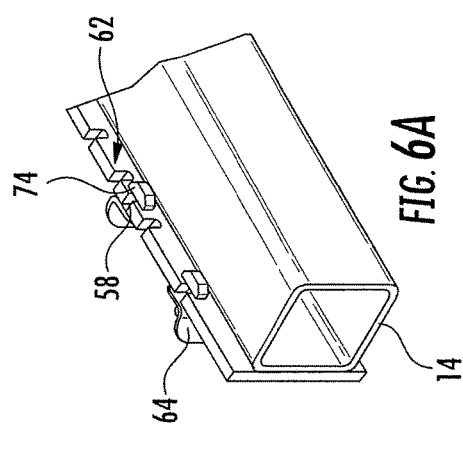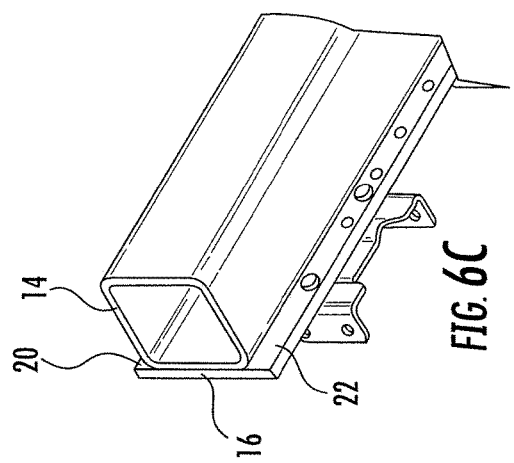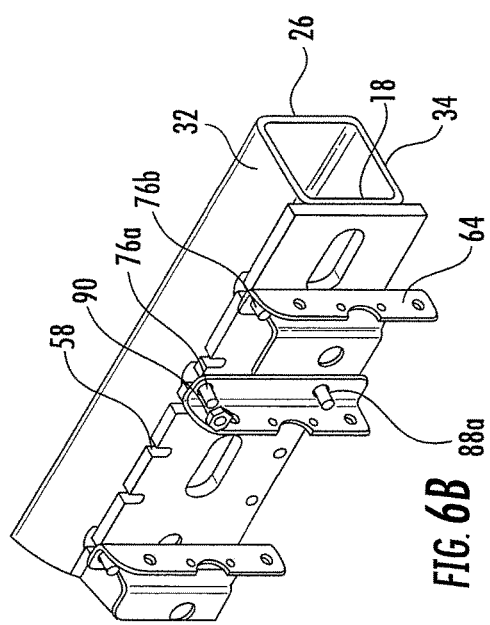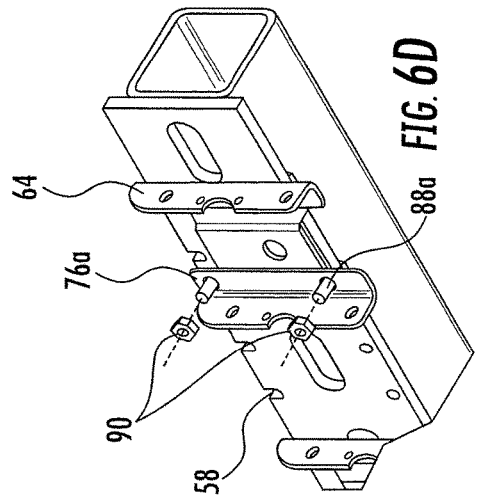

WHEEL ASSEMBLY FOR AN ADJUSTABLE PLANTER BAR SYSTEM

RELATED AND CO-PENDING APPLICATIONS

This application is a continuation-in-part application of U.S. patent application Ser. No. 14/634,076, filed Feb. 27, 2015, which claims the benefit of U.S. Provisional Patent Application No. 61/946,453 filed on Feb. 28, 2014, each of which is expressly incorporated herein by reference in its entirety. This application additionally claims the benefit of U.S. Provisional Patent Application No. 62/212,355 filed on Aug. 31, 2015, which is expressly incorporated herein by reference in its entirety.

FIELD

The present disclosure relates generally to the field of tools, and more particularly to a wheel assembly that may be coupled to a planter.

BACKGROUND

Planters are known to be useful as equipment for sowing crops on a field and other agricultural applications. Planters are often needed for large-scale farming operations. Conventional planters have bins arranged in one or more rows for dispensing seeds or fertilizer as the planter is towed behind a tractor. The most common spacing for rows in the United States is 30 inches apart, and the planter units can provide precision sowing according to the type of seed to be sown and the rate at which the seeds are to be sown. Some planters have now been developed which allow for a single planter to be adjusted to multiple row spacings. For example, a single planter may provide a first configuration of planter units having 30-inch spacing, a second configuration of planter units having 20-inch spacing, and a third configuration of planter units having 70-centimeter (27.55 inch) spacing. While both conventional and variable-spacing planters may be useful in some instances, there are still numerous deficiencies with existing planter approaches and there remains the potential for more useful planters and planter accessories for the modern farming industry.

SUMMARY

In one aspect of the present disclosure, a multi-row planter system comprises a support bar extending laterally between a first end and a second end, the support bar having a leading face and a trailing face; a leading plate mounted to the leading face of the support bar; a trailing plate mounted to the trailing face of the support bar; a plurality of planter units coupled to the trailing face and adapted to be slidably adjustable laterally between the first end and the second end of the support bar; and a plurality of wheel assemblies coupled to the leading face of and adapted to be slidably adjustable laterally between the first end and the second end of the support bar.

In some embodiments the leading plate extends beyond the leading face of the support bar to form an upper leading rail and a lower leading rail, and wherein each of the plurality of claim assemblies are coupled to the leading plate by a mounting bracket which extends around the upper leading rail and lower leading rail. In some embodiments the mounting bracket comprises a mounting plate positioned between the wheel assembly and the leading plate, an upper fastener adapted to fasten to the upper leading rail, and a lower fastener adapted to fasten to the lower leading rail. In some embodiments each of the upper fastener and lower fastener are configured to receive a threaded fastener there through such that tightening the threaded fastener serves to secure the wheel assembly to the support bar.

In some embodiments each of the plurality of wheel assemblies is positioned laterally along the support bar to be leading one of the plurality of planter units. In some embodiments the wheel assembly comprises a mounting surface adapted to engage the mounting bracket. In some embodiments the wheel assembly further comprises a piston assembly adapted to permit movement of the wheel assembly between a first folded position and a second extended position. In some embodiments the system further comprises a locking tab adapted to engage the piston assembly to hold the wheel assembly in the second extended position.

According to another aspect of the present disclosure, a multi-row planter system comprises a support bar extending laterally between a first end and a second end, the support bar having a leading face and a trailing face; a leading plate mounted to the leading face of the support bar; and a plurality of wheel assemblies coupled to the leading face of the support bar by a mounting bracket, each of the plurality of wheel assemblies adapted to be slidably adjustable laterally between the first end and the second end of the support bar. Each of the plurality of wheel assemblies comprises a wheel; a connection assembly having a mounting surface adapted to engage the mounting bracket; and a piston assembly extending between the wheel and the connection assembly, the piston assembly adapted to permit movement of the wheel assembly between a first folded position and a second extended position.

In some embodiments the piston assembly is further adapted to permit articulation between the wheel and connection assembly as the multi-row planter system is moved across varying terrain. In some embodiments the piston assembly further comprises a locking tab for securing the wheel assembly in the second extended position. In some embodiments the wheel assembly further comprises an oscillation dampening assembly adapted to dampen oscillation of the wheel. In some embodiments the oscillation dampening assembly is adapted to limit wheel oscillation to less than 7 degrees from a vertical axis. In some embodiments the system further comprises a second wheel mounted adjacent the wheel.

In yet another aspect of the present disclosure, a multi-row planter bar having a leading plate mounted to a leading face and a trailing plate mounted to a trailing face, and a method of configuring the multi-row planter bar comprises slidably positioning a first planter unit laterally along the planter bar, wherein the first planter unit is slidably adjustable along the full lateral length of the planter bar and wherein the first planter unit is coupled to the trailing plate via a first mounting bracket; and slidably positioning a first wheel assembly laterally along the planter bar, wherein the first wheel assembly is slidably adjustable along the full lateral length of the planter bar and wherein the first wheel assembly is coupled to the leading plate via a second mounting bracket.

In some embodiments the first wheel assembly is positioned directly in front of the first planter unit. In some embodiments the method further comprises the steps of slidably positioning additional planter units and additional wheel assemblies laterally along the planter bar. In some embodiments the additional planter units and additional wheel assemblies are added to the planter bar in pairs, such that the planter bar has an equal number of planter units and wheel assemblies. In some embodiments the method further comprises extending the wheel assembly from a first folded position to a second extended position. In some embodiments the method further comprises engaging a locking tab of the first wheel assembly to secure the wheel assembly in an extended posture.

BRIEF DESCRIPTION OF THE DRAWINGS

FIG. 1A is a side view of a planter bar described herein, while

FIGS. 3A to 3C are front views of a plate member adapted for coupling to a planter bar as according to one embodiment.

FIGS. 6A to 6D are perspective views of a planter bar, plate member, and mounting plate as described in FIGS. 3 & 4 herein.

DETAILED DESCRIPTION

Figure 1B:
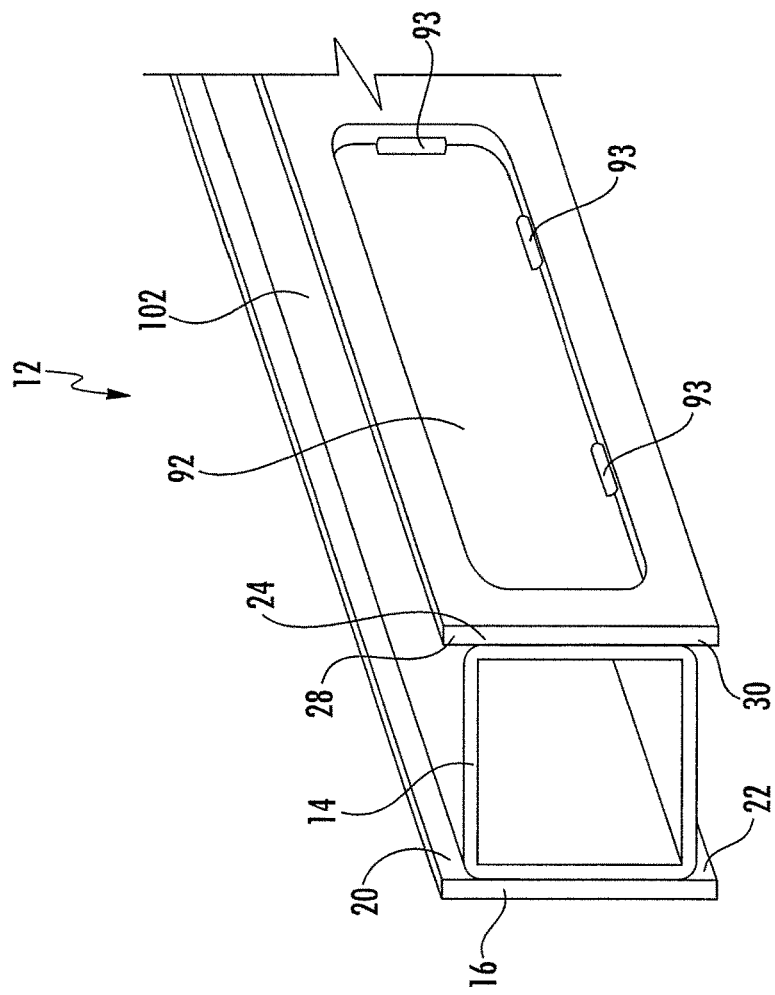
FIG. 1B is a perspective view of the planter bar of FIG. 1A.

A wheel assembly for selectable coupling, via a plate member, to a multi-row planter system providing universally adjustable row and accessory spacing is described herein. As used herein, spatially relative terms, such as "horizontal," "upper," "lower," "leading," and "trailing," and the like, are used for ease of description to describe one element or feature's relationship to another element(s) or feature(s) as illustrated in the figures. The spatially relative terms are intended to encompass different orientations of the apparatus in use or operation in addition to the orientation depicted in the figures. The apparatus may be otherwise oriented (rotated 90 degrees or at other orientations) and the spatially relative descriptors used herein may likewise be interpreted accordingly. In particular, "leading" refers to the portion of the feature closest to a vehicle pulling the planter, while "trailing" refers to the portion further aft from the vehicle.

FIGS. 1 through 6 illustrate various aspects of a multi-row planter system 10 to which a wheel assembly 700 may be coupled. Although embodiments of multi-row planter systems 10 are described below, the wheel assembly may be coupled to additional systems or apparatuses and the description of the multi-row planter system 10 is not intended to be limiting.

As shown in the Figures, the multi-row planter system 10 comprises a planter bar 12 having a first plate member 16 forming rails 20, 22 which are further described below. First plate member 16 may have a plurality of apertures 54 which are positioned and adapted for connection to a plurality of mounting plates 64. To each mounting plate 64 may be coupled one of a plurality of planting units 60 (e.g., any of 60a, 60b, 60c shown in FIG. 5B). Apertures 54 are positioned to provide multiple configurations of the plurality of mounting plates 64, such that planting units 60 can be placed with a variety of spacings between them (i.e. 20 inch, 30 inch, 70 centimeter spacing between planting units 60). In some embodiments, second plate member 24 is configured with apertures 54, 56 identically to first plate member 16 as illustrated in the figures. Of course, the system also includes multi-row planter systems 10 that include a continuous clear rail, such as these shown in FIGS. 1, 2 & 5, and described in more detail in U.S. application Ser. No. 14/634,076, filed Feb. 27, 2015, the entirety of which is incorporated herein by reference in its entirety.

Since most multi-row planter systems 10 are configured to be towed or pulled by a vehicle, they typically require wheel assemblies. The variable nature of the spacing between planting units 60 in the multi-row planter system 10 presents a challenge for the placement of such wheel assemblies. In particular, a certain lateral position along the planter bar 12 may be advantageous for a first spacing distance between planting units 60 but undesirable or even counterproductive for a second spacing distance between planting units 60. For example, a wheel assembly's lateral position along planter bar 12 would be undesirable where it interferes with a planting unit 60, where it causes the wheel assembly to travel on top of the seed bed or on top of a furrow, or where it causes instability in the towing of the multi-row planter system 10. It is thus desirable to provide a wheel assembly which is laterally adjustable along the planter bar 12 and may be selectively coupled to the multi-row planter system 10. Such a wheel assembly 700 is described herein.

The planter bar 12 can include a horizontal support bar 14, a first plate member 16 coupled to the trailing side 18 of the support bar 14, and a second plate member 24 coupled to the leading side 26 of the support bar 14, wherein the leading side 26 is opposite the trailing side 18. In some embodiments, the first plate member 16 forms an upper, trailing rail 20 that extends above the trailing side 18 of the support bar 14, a lower, trailing rail 22 that extends below the trailing side 18 of the support bar 14, or both 20, 22. In some embodiments, the second plate member 24 forms an upper, leading rail 28 that extends above the leading side 26 of the support bar 14, a lower, leading rail 30 that extends below the leading side 26 of the support bar 14, or both 28, 30.

The first plate member 16 and the second plate member 24 can be welded to the support bar 14. This provides additional support for the support bar 14 and eliminates the need for trussing or additional reinforcement against bending. Thus, in some embodiments, there is no trussing or additional bending reinforcement within the support bar, external to the support bar, or both. In some embodiments, as shown in FIG. 3B, the first plate member 16 and second plate member 24 can include intermittent cutouts 92 between the upper rail 20, 28 and the lower rail 22, 30. The cutouts 92 can be any shape including elongated and/or oblong. In addition to making the planter bar 12 lighter, this technique also allows for additional welds 93 between the plate member 16, 24 and the support bar 14 along the perimeter of the cutout 92. These additional welds further strengthen the planter bar 12.

In some embodiments, the support bar 14 is an elongated bar with a uniform cross-section. In some embodiments, the support bar 14 can be a hollow bar. For example, as shown in FIGS. 1, 2, 5, and 6, the support bar 14 can have a hollow, generally square or rectangular cross-section. In such embodiments, the support bar 14 can have a trailing side 18, a leading side 26, a top side 32, and a bottom side 34. As evident from the Figures, generally square or rectangular is intended to encompass a square or rectangular cross-sections with rounded (fillet) or chamfered corners, as well as squares and rectangles with 90° corners.

In some embodiments, each side 18, 26, 32, 34 of the support bar 14 can be 6" long, while each side 18, 26, 32, 34 of the support bar 17 can be 7" long in other embodiments. In some embodiments, the sides 18, 26, 32, 34 of the planter bar 12 can be a thickness selected from the group consisting of ¼", ⅜", ½" ⅝" and ¾" or any other useful thickness.

In some embodiments, the first plate member 16, the second plate member 24, or both 16, 24, can be 7" tall and ½" thick. In some embodiments, it may be desirable to retrofit an existing system that used tubing that is the same height as the distance between upper and lower openings 76a,b and 88c,d in a mounting plate 64. In such embodiments a spacer (not shown) can be attached to the leading side 24, trailing side 18, or both. Depending on if rails are desired on just the trailing side 18, just the leading side 24, or both, first and or second plate members 16, 24 can be attached to the spacer(s). In such embodiments, the rails 20, 22, 28, 30 are defined by the portion of the respective plate members 16, 24 that extend above or below the spacer 102.

Figure 13:
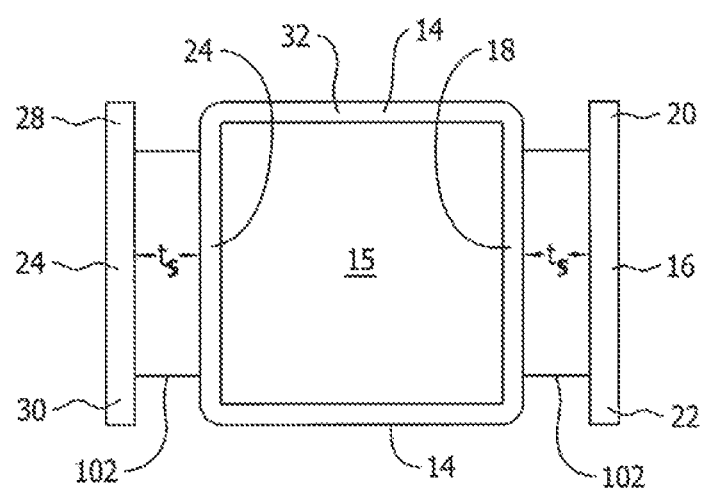
FIG. 13 is a cross-sectional view of a planter bar that includes spacers between the first plate member and the support bar 14 and the second plate member and the support bar.

As shown in FIG. 13, the first plate member 16, the second plate member 24, or both 16, 24 can be coupled to the support bar 14 by a spacer 102. The thickness ($t_s$) of the spacer 102 should be selected so that it is possible to access the threaded fasteners 74 when tightening or loosening clips 70, 84 to move or secure the mounting plates 64. In some embodiments, the thickness ($t_s$) can be at least 1", or at least 1.25", or at least 1.5", or at least 1.75", or at least 2". In some embodiments, the thickness ($t_s$) can be 4" or less, or 3" or less, or 2.5" or less, or 2" or less.

In some embodiments, where only one plate member 16 is used, the width of the support bar 14, the thickness of the spacer 102, and the thickness of the plate member 16 can be selected so that the overall width of the planter bar 12 is a desired value. For example, in some embodiments, the width of the support bar 14 can be 5", the thickness of the spacer can be 1.5", and the thickness of the plate member 16 can be 0.5", so that the total width is 7". At the same time, the height of the support bar and the plate member can be 7". This allows users all of the benefits described herein—including a clear rail, while retrofitting existing systems and maintaining the option of using existing U-bolt attachment techniques.

Figure 4A:
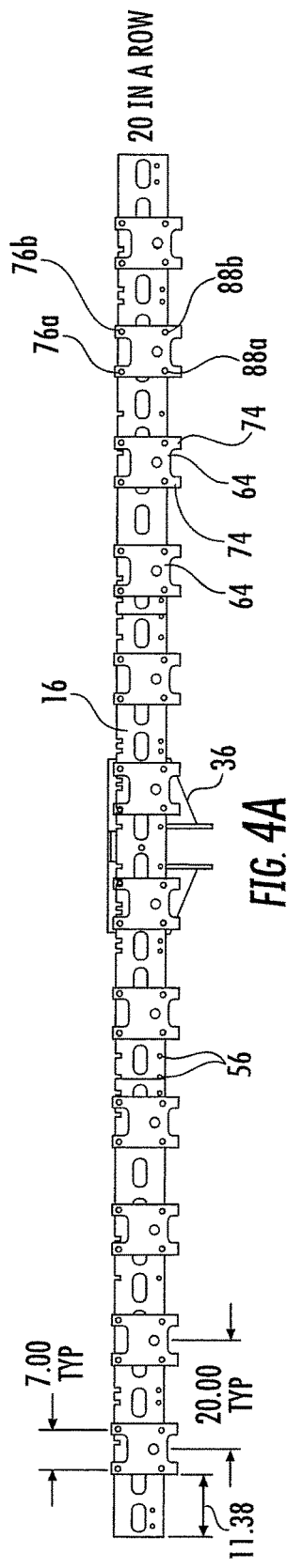
FIGS. 4A to 4C are front views of a plate member having a plurality of mounting plates arranged thereon for providing 20 inch, 30 inch, and 70 cm mounting plate spacing arrangements as, shown in FIGS. 3A-3C.
Figure 4B:
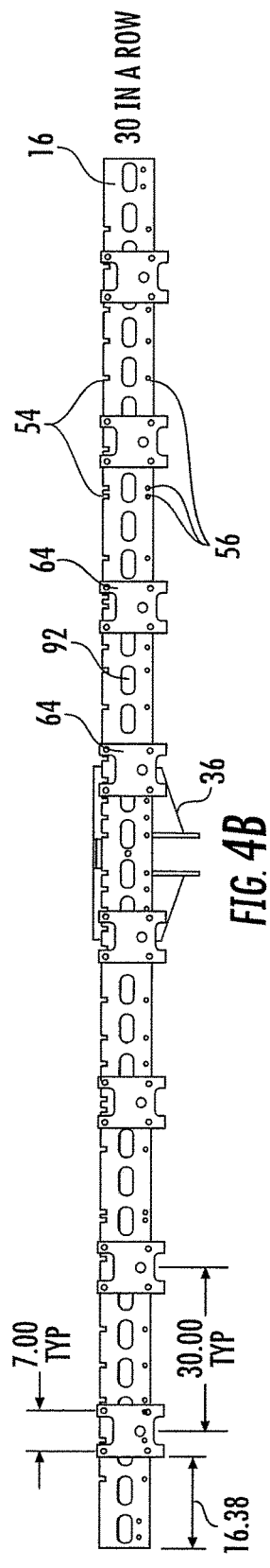
Figure 4C:
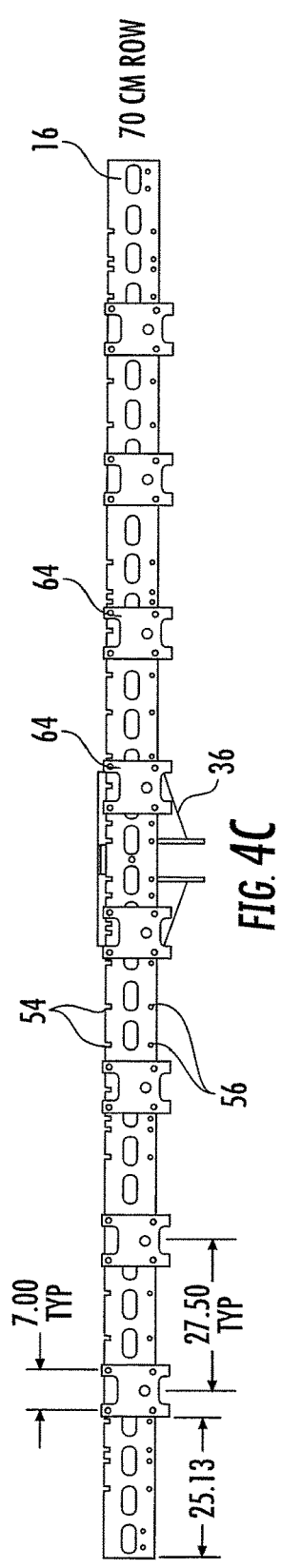

In some embodiments, the multi-row planter system 10 is adapted for coupling to a vehicle positioned proximate the leading side 26. For example, as shown in FIG. 4, the multi-row planter system 10 can include a vehicle mount 36. In some embodiments, the vehicle mount 36 can be attached to the upper, leading rail 28, the lower, leading rail 30, or both 28, 30 using the same securing techniques and fasteners described herein for attachment of the planting units 38 to the planter bar 12. In other embodiments, the vehicle mount 36 can be welded to the planter bar 12. In still other embodiments the planter bar 12 can be attached to the vehicle mount 36 by a combination of bolts.

In some embodiments, the multi-row planter system 10 includes at least one planting unit 60 (e.g., 60a, 60b, 60c) coupled to the planter bar 12 by a mounting plate 64. The mounting plate 64 can be coupled to an inside surface 62 of the upper, trailing rail 20 and the lower trailing rail 22. In some embodiments, at least one planting unit 60 includes a mounting plate 64 adjacent an outside surface 66 of the first plate member 16 and at least one upper fastener 68 extending from the outside surface 66 of the first plate member 16 and contacting the inside surface 62. In some embodiments, the at least one upper fastener 68 is adjustably coupled to the mounting plate 64.

In some embodiments, the upper fastener 68 can include an upper clip 70 that extends over an upper edge 72 of the upper, trailing rail 20 and contacts the inside surface 62 of the upper, trailing rail 20. In some embodiments, the upper clip 70 is coupled to the mounting plate 64 by at least one threaded faster 74 (e.g., a screw or a bolt). In some embodiments, the upper clip 70 can be adapted to receive the threaded fasteners 74 via at least one clip orifice 78. In some embodiments, the at least one clip orifice 78 can be threaded, while the clip orifice 78 is not threaded in other embodiments. In embodiments were the clip orifice 78 is not threaded, the threaded fastener 74 can be secured with a nut 90.

In some embodiments, the upper clip 70 is coupled to the mounting plate 64 by at least two threaded fasteners 74a, 74b. In some embodiments, the mounting plate 64 can include at least two upper mounting plate orifices 76a, 76b that are spaced apart by the same distance as the corresponding clip orifices 78a, 78b.

As will be understood, in some embodiments, the lower clip 84 can be identical to the upper clip 70.

Figure 1A:
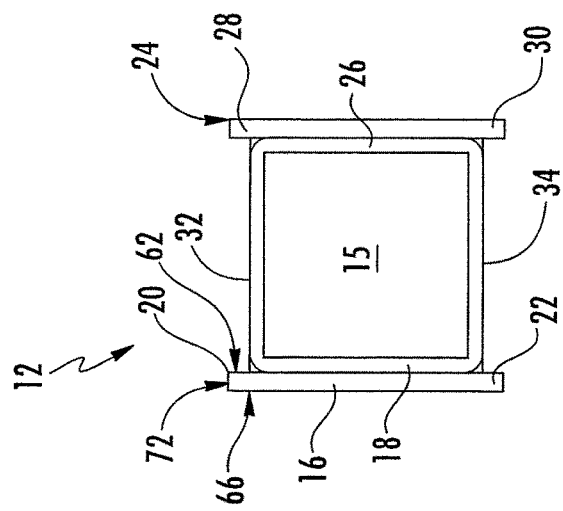
Figure 2:
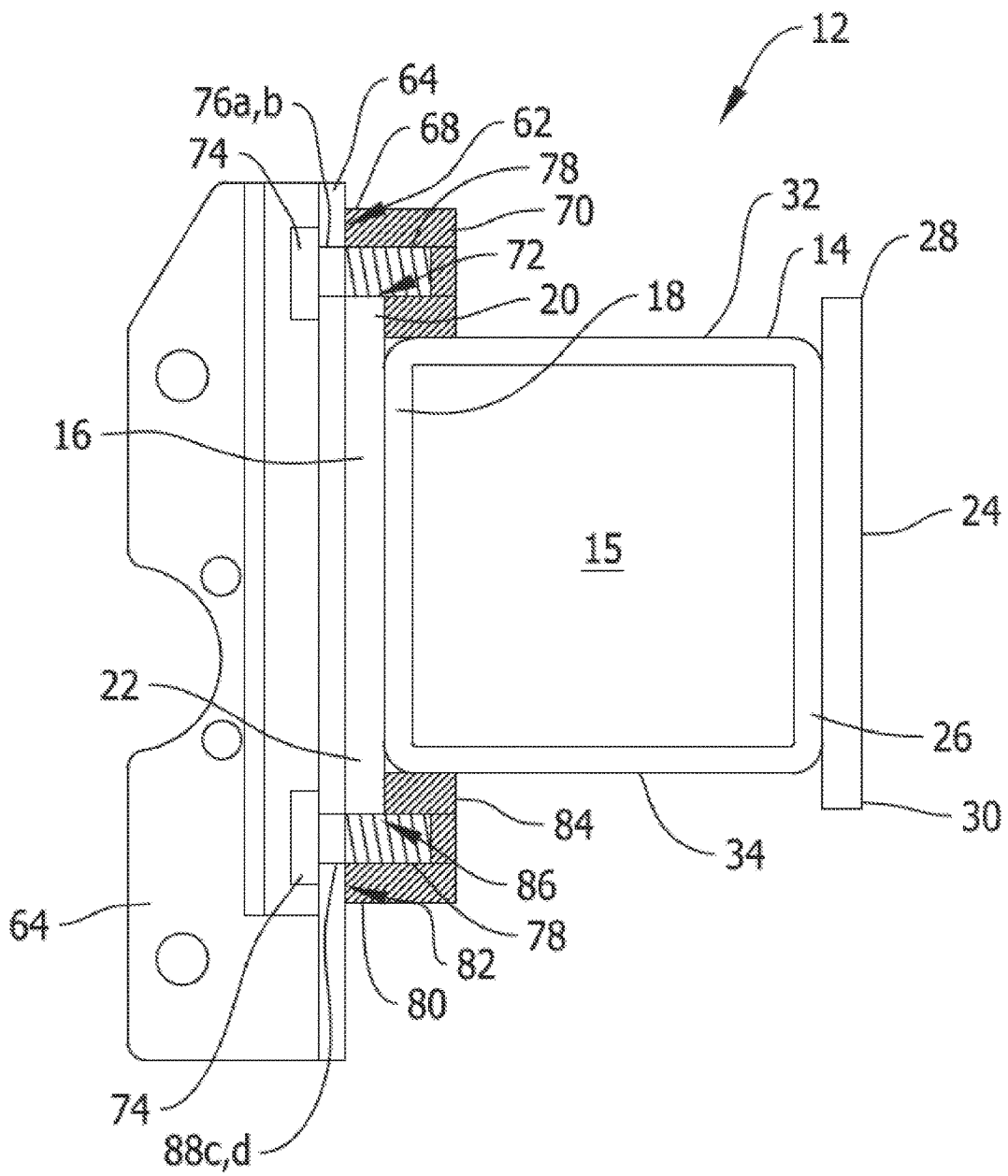
FIG. 2 is a side cross-sectional view of a mounting plate clipped to a planter bar as described herein.
Figure 5A:
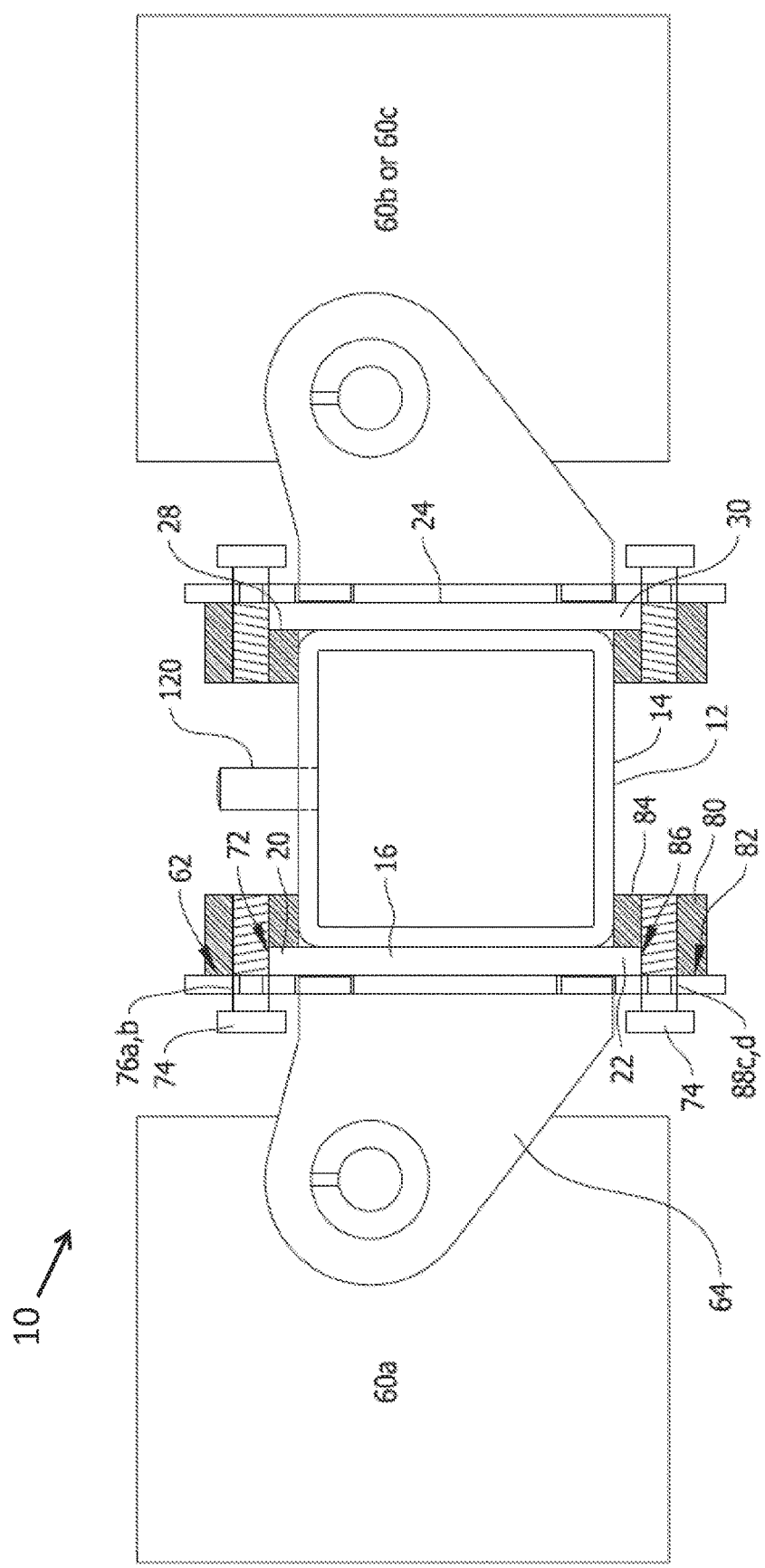
FIGS. 5A and 5B are side cross-sectional views of a mounting plate coupled to a planter bar as described herein

As illustrated in FIGS. 1 and 5, the multi-row planter system 10 includes a distribution conduit 15 comprising the hollow center of planter bar 12. At least one inlet 120 (FIG. 5A) may be disposed on the top side 32 of planter bar 12 and adapted to permit the introduction of air and/or a solid substance (e.g., seeds or solid fertilizer) stored in a hopper (not shown) connected to inlet 120. In some embodiments, multi-row planter system 10 includes a vacuum system (not shown) which is coupled to planter bar 12 and which assists in the distribution of air and/or a solid substance (e.g., seeds or solid fertilizer).

Referring to FIG. 5, in some embodiments, the multi-row planter system 10 also includes at least one lower fastener 80 extending from the outside surface 66 and contacting an inside surface 82 of the lower, trailing rail 22. In some embodiments, the at least one lower fastener 80 is adjustably coupled to the mounting plate 64. While shown specifically in the embodiment of FIG. 5, it will be understood that any mounting plate-clip (64, 70, 84) system that attaches to a leading rail system 20, 22 can also attach to a trailing rail 28, 30 using the same.

The lower fastener 80 can include a lower clip 84 that extends over a lower edge 86 of the lower, trailing rail 22 and contacts the inside surface 82 of the lower, trailing rail 22. In some embodiments, the lower clip 84 is coupled to the mounting plate 64 by at least one threaded faster 74 (e.g., a screw or a bolt). In some embodiments, the lower clip 84 can be adapted to receive the threaded fasteners 74 via at least one clip orifice 78. In some embodiments, the at least one clip orifice 78 can be threaded, while the clip orifice 78 is not threaded in other embodiments. In embodiments where the clip orifice 78 is not threaded, the threaded fastener 74 can be secured with a nut 90.

As shown in FIG. 1, there are no obstructions for the clips 60, 70 used to secure the mounting plates 64 to the planter bar 12. This results in a clear rail, which allows the mounting plate 64 to slide along the rails 20, 22 or 28, 30 from adjacent to a master opening to the end of the planter bar 12 without needing to completely remove either clip 60, 70 from the mounting plate 64. In some embodiments, a majority (>50%) of the length of the first plate member 16, the second plate member 24, or both, on each side of a mid-point of the planter bar 12 comprises a continuous clear rail. In some embodiments, at least 70%, or at least 75%, or at least 80%, or at least 85% of the length of the first plate member 16, the second plate member 24, or both, on each side of a mid-point of the planter bar 12 comprises a continuous clear rail. As used herein, "continuous clear rail" refers to a continuous segment of clear rail and not the total of multiple separate portions of clear rail.

Unlike existing systems, this makes the spacing of moveable farming units 60 mounted on the planter bar 12 described herein universally adjustable to conform with the desired row spacing for any crop. In contrast, existing multi-row planter systems are designed for a single spacing, which cannot be changed because of both obstructions and the existing u-bolt technique used to fasten the mounting plate to the feeder bar.

As shown in FIGS. 3 and 4, in some embodiments the clear rail is abandoned in favor of placing mounting plates 64 in predetermined positions via upper apertures 54 along the top surface of first plate member 16 and lower apertures 56 disposed along the lower edge of first plate member 16. In some embodiments, the apertures 54 can be an orifice, while the apertures 54 can be notches 58 in the upper, trailing rail 20 in other embodiments. In some embodiments, the lower, trailing rail 18 includes lower apertures 56 disposed vertically below the corresponding upper apertures 54. The apertures 56 can be orifices or notches.

In some embodiments, the apertures 54 and/or 56 are positioned as first engagement pairs 42 and second engagement pairs 46 which correspond with the location of mounting plate orifices 76*a,b* and 88*a,b*. In some embodiments, the apertures 54 and lower apertures 56 in the first plate member 16 can correspond with identically placed apertures 54 and lower apertures 56 in the second plate member 24.

In some embodiments, the lower clip 84 is coupled to the mounting plate 64 by at least two threaded fasteners 74*a*, 74*b*. In some embodiments, the mounting plate 64 can include at least two lower mounting plate orifices 88*a*, 88*b* which allow the threaded fasteners 74*a*, 74*b* to pass through the lower mounting plate orifices 88*a*, 88*b*, the lower apertures 56, and be secured in the clip orifices 78*a*, 78*b*.

As will be understood, the apertures 54 can be included or excluded from either or both of the plate members 16, 24. In either case, the presence of apertures 54 does not preclude the plate member 16, 24 from being a clear rail so long as, when the threaded fasteners 74 are partially loosened, the mounting plate-clip (64, 70, 84) assembly can slide continuously from adjacent the vehicle mount 36 to an end of the planter bar 12 and, in some cases, off the planter bar 12.

In one method, a first planting unit 60 can be secured to the planter 12 by passing a pair of threaded fasteners 74 through the upper mounting plate orifices 76*a*, 76*b* and partially securing the threaded fasteners 74 in the clip orifices 78 of the upper clip 70. The upper clip 70 can then be placed over the upper, trailing rail 20. A pair of threaded fasteners 74 can then be inserted through the lower mounting plate orifices 88*a*, 88*b*, and partially secured in the clip orifices 78 of the lower clip 84. The mounting plate 64 can then slide to the appropriate location and then the threaded fasteners 74 tightened to firmly secure the mounting plate 64 and the planter unit 60 to the planter 12. This process can be repeated with additional planting units 60 at the desired spacing distance.

Once the planting units 60 are attached to the planter 12, if a row spacing change is desired, the threaded fasteners 74 just need to the partially loosened, the planting unit(s) 60 repositioned consistent with the new spacing, and the threaded fasteners 74 tightened to secure the planting unit(s) 60 in place.

In some embodiments, the upper mounting plate orifices 76*a*, 76*b* can be threaded, while the upper mounting plate orifices 76*a*, 76*b* can be unthreaded in other embodiments. In embodiments where the upper mounting plate orifices 76*a*, 76*b* are not threaded, the threaded fastener 74 can pass through an upper mounting plate orifice 76*a*, 76*b* and the upper apertures 54, and be secured by a nut 90. In embodiments where the upper mounting plate orifices 76*a*, 76*b* are threaded, each threaded fastener 74 can pass through the upper apertures 54 and be secured by the respective upper mounting plate orifice 76*a*, 76*b*.

Similarly, in some embodiments, the lower mounting plate orifices 88*a*, 88*b* can be threaded, while the lower mounting plate orifices 88*a*, 88*b* can be unthreaded in other embodiments. In embodiments where the lower mounting plate orifices 88*a*, 88*b* are not threaded, the threaded fastener 74 passing through an lower mounting plate orifice 88*a*, 88*b* and the lower aperture 56 can be secured by a nut 90. In embodiments where the upper mounting plate orifices 88*a*, 88*b* are threaded, each threaded fastener 74 passing through a lower aperture 56 can be secured by the respective lower mounting plate orifice 88*a*, 88*b*. In some embodiments, the upper apertures 54 are notches 58, while the lower apertures 56 are orifices.

The threaded fastener 74 can be a bolt, for example a standard hex bolt, or any other appropriate fastener.

In some embodiments, the moveable farming unit 60 is a planter unit 60*a*, which can include the mounting plate 64, a hopper 94 and dispensing portion, and a lifting portion 96. The moveable farming units 60 can also include fertilizer units 60*b*, wheels 60*c*, and other farming units that may need to be adjusted depending on the spacing between adjacent rows of crops. As shown in FIG. 5, in some embodiments, moveable farming units 60 can be adjustably attached to each side of the planter bar 12. For example, wheels 60*c* can be attached to the rails 28, 30 on the leading side of the planter bar 12, while planter units 60*a* can be attached to the rails 20, 22 on the trailing side of the planter bar 12. In other embodiments, fertilizer units 60*b* can be attached to the rails 28, 30 on the leading side of the planter bar 12, while planter units 60*a* can be attached to the rails 20, 22 on the trailing side of the planter bar 12. In some embodiments, the fertilizer trench produced by the fertilizer units 60*b* can be slightly offset from the seed line laid down by the planter unit 60*a*. Using the clear rail embodiments described herein, the distance between the seed line and the fertilizer trench can be universally adjustable (e.g., 1" apart, or 2" apart, or 3" apart, and on either side of the seed line).

The present disclosure is directed to a wheel assembly 700 for use in conjunction with the multi-row planter system 10 described above or similar planter system or an apparatus or system which requires towing from a vehicle. The wheel assembly 700 is illustrated in FIGS. 7 through 11 and described below.

Figure 7B:
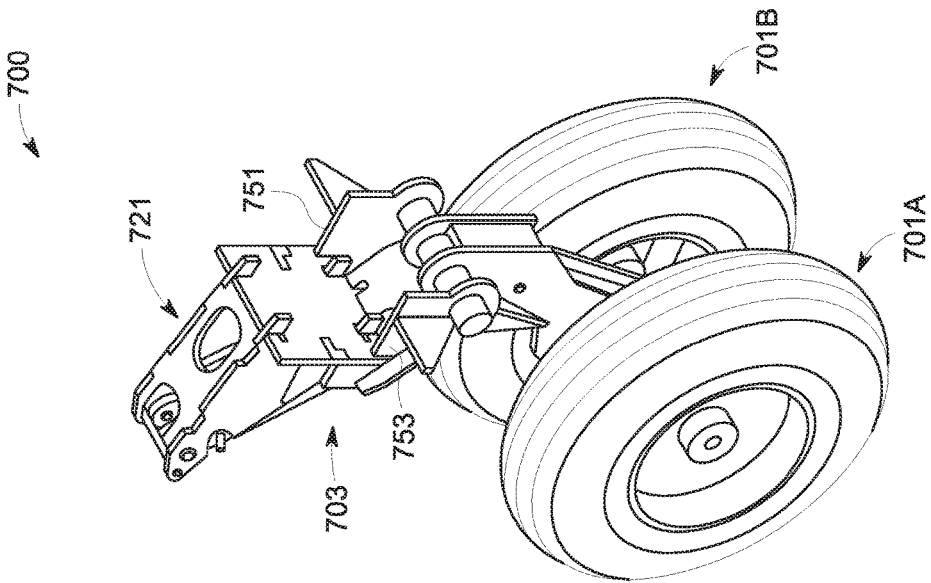
FIGS. 7A and 7B are perspective views of a wheel assembly for selectable coupling to a plate member and a planter bar as described herein.
Figure 7A:
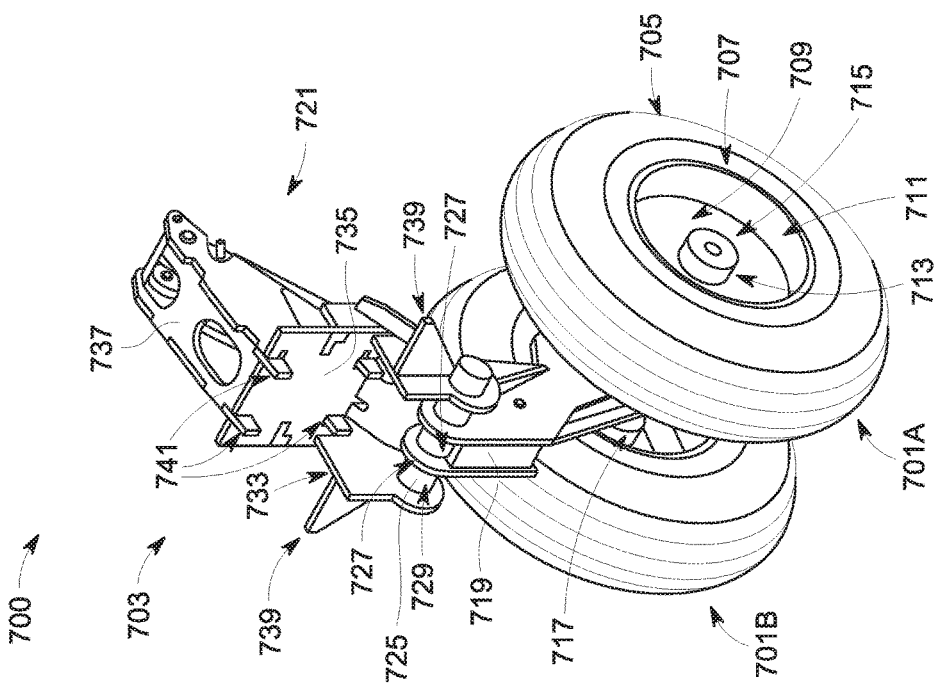

Referring to FIG. 7, wheel assembly 700 comprises a pair of wheels 701a, 701b connected to a strut assembly 703. Each wheel 701 comprises a tire 705 mounted on a hub 707. The hub 707 has a circular wall 709 surrounded by an annular side wall 711 outwardly extending away from the circular wall 709. Circular wall 709 includes an aperture 713 adapted to receive a mounting bolt 715 and/or an axle 717 of the strut assembly 703. In some embodiments a mounting bolt 715 and nut (not shown) are used to connected hub 707 to the axle 717. In other embodiments the axle 717 is passed through aperture 713 and a pin (not shown) is passed through an aperture in the axle 717 to connect the hub 707 to axle 717.

In a first configuration the circular wall 709 of each of the pair of wheels 701a, 701b is disposed closer to the strut assembly 703 such that annular side wall 711 extends away from strut assembly 703. This first configuration provides a first spacing between the pair of wheels 701a, 701b. In a second configuration (not shown) the circular wall 709 of each of the pair of wheels 701a, 701b is disposed farther from the strut assembly 703 such that annular side wall 711 extends toward strut assembly 703. This second configuration provides a second spacing between the pair of wheels 701a, 701b. The second spacing is wider than the first spacing. These variable spacings may be advantageously used with variable spacings between seed rows or variable configurations of the mounting brackets 64 and planter units 60.

Strut assembly 703 comprises axle 717, a rod member 719, and connection module 721. Axle 717 extends between and connects each of the pair of wheels 701a, 701b. Axle 717 is passed through an aperture 723 in the lower portion of rod member 719. Axle 717 is generally perpendicular to rod member 719. Rod member 719 is connected to the connection module 721 via a pin 725, which is passed through at least one aperture 727 in the upper portion of rod member 719 as well as through at least one aperture 729 of connection module 721. A piston assembly 731 (FIG. 8B) is connected between connection module 721 and rod member 719 to resist compressive forces during towing operations and to assist in folding of strut assembly 703 as described below.

Connection module 721 is configured to connect wheel assembly 700 to multi-row planter system 10. Connection module 721 comprises a first mounting surface 733, second mounting surface 735, and third mounting surface 737. First mounting surface 733 comprises the distal ends of a first vertical support member 751 and second vertical support member 753 each of which connect to second mounting surface 735. In some embodiments a pair of flaps 739 extend outwardly from first mounting surface 733 to provide additional lateral support to the multi-row planter system 10 which is connected to wheel assembly 700. Second mounting surface 735 has a plurality of pins 741 extending normal from the second mounting surface 735 (four pins 741 are illustrated in FIGS. 7-11). These pins 741 are configured to be received by apertures in mounting plate 64, or to extend into a cutout 92 of planter bar 92 or to correspond with the various apertures 54, 56 of first plate member 16. In some embodiments second mounting surface 735 additionally includes at least one aperture adapted to receive a mounting bolt which secures second mounting surface 735 to planter bar 12.

In some embodiments, the second mounting surface 735 is used as or is coupled to the mounting plate 64. In either case, the second mounting surface or the mounting place 64 includes openings 76a,b and 88c,d adapted to receive an upper fastener 64 and lower fastener 80, respectively. In this manner, the wheel assembly 700 can be adjustably coupled to the planter bar (e.g. a continuous clear rail) in an infinitely adjustable manner. Additional details of the continuous clear planter bar attachment system can be found in U.S. application Ser. No. 14/634,076, filed Feb. 27, 2015, the entirety of which is incorporated herein by reference in its entirety.

First mounting surface 733 and second mounting surface 735 are configured to engage planter bar 12 when wheel assembly 700 is connected to multi-row planter system 10. Third mounting surface 737 is optionally engaged when wheel assembly 700 is connected to multi-row planter system 10, and is used to support additional components extending from planter bar 12.

Piston assembly 731 is connected between a distal end 747 of connection module 721 and rod member 719. Piston assembly 731 comprises a piston 743 and rod 745. Piston assembly 731 may additionally include a locking tab for locking the piston 743 and rod 745 in a rigid, extended position, thus holding connection assembly 721 and rod member 719 at a constant angle relative to each other. When a locking tab is not engaged, piston assembly 731 is configured to resist compressive forces as the wheel assembly 700 and multi-row planter system 10 are towed. However, piston assembly 731, in conjunction with pin 725, does permit some motion between connection assembly 721 and rod member 719. As wheels 701a, 701b encounter variations in the terrain, rod member 719 will articulate slightly around pin 725. The motion of rod member 719 is restricted by the piston assembly 721, and the piston 743 expands and contracts as rod member 719 articulates about pin 725.

Figure 9:
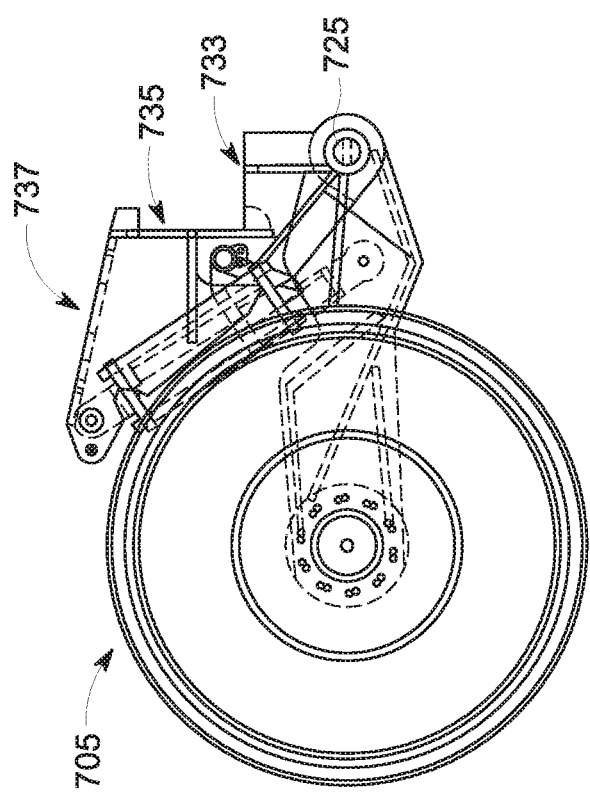
FIG. 9 is a side view of a wheel assembly in a folded position as described herein.
Figure 10:
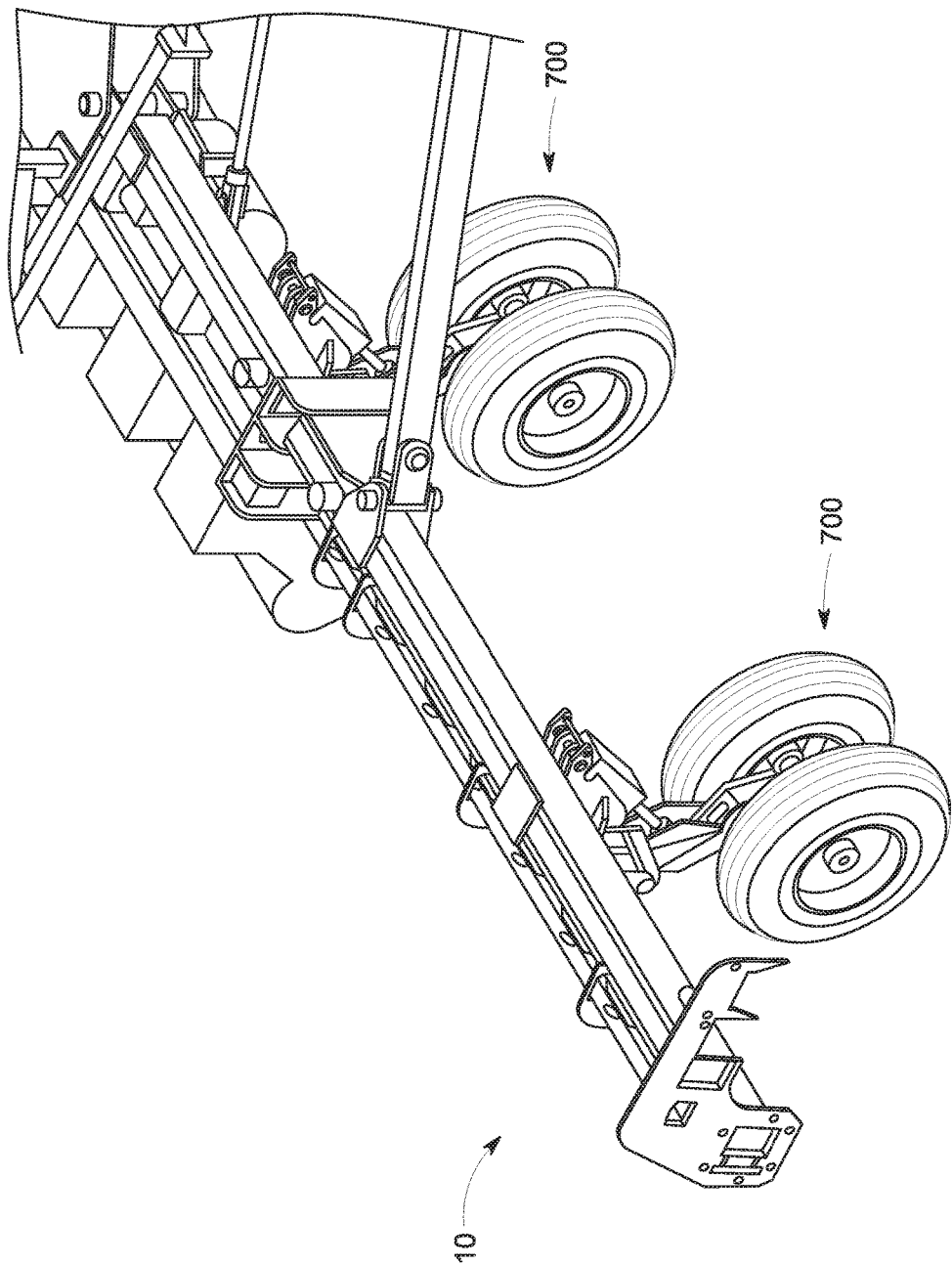
FIG. 10 is a perspective view of a pair of wheel assemblies coupled to a plate member and a planter bar as described herein.
Figure 11:
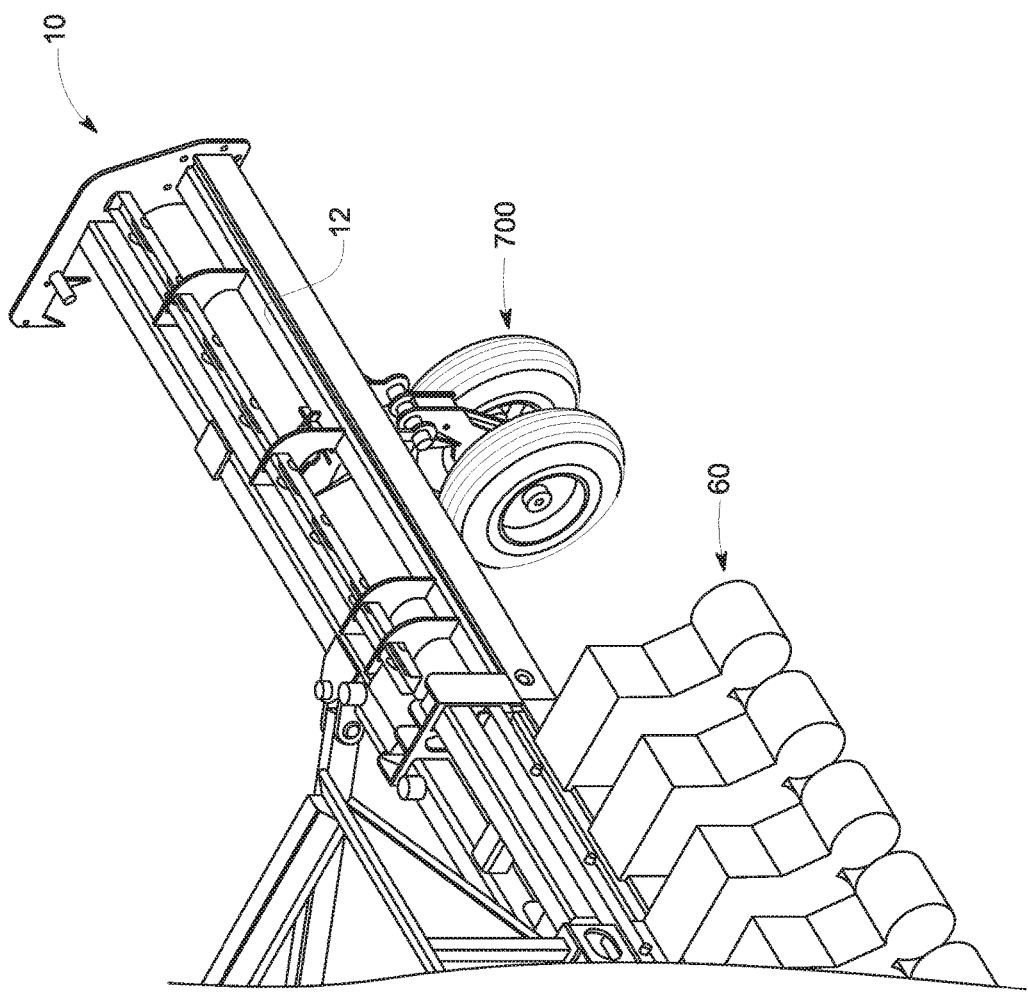
FIG. 11 is a perspective view of a wheel assembly coupled to a plate member and a planter bar as described herein.

Referring to FIG. 9, when rod 745 is inserted into piston 743, the angle θ between connection assembly 721 and rod member 719 is reduced, resulting in a folding motion of wheel assembly 700. In some embodiments a locking tab 755 is provided for locking piston assembly 731 into a folded position as illustrated in FIG. 9. This folded position may be advantageous for storage and transportation of wheel assembly 700 or multi-row planter system 10.

Figure 8B:
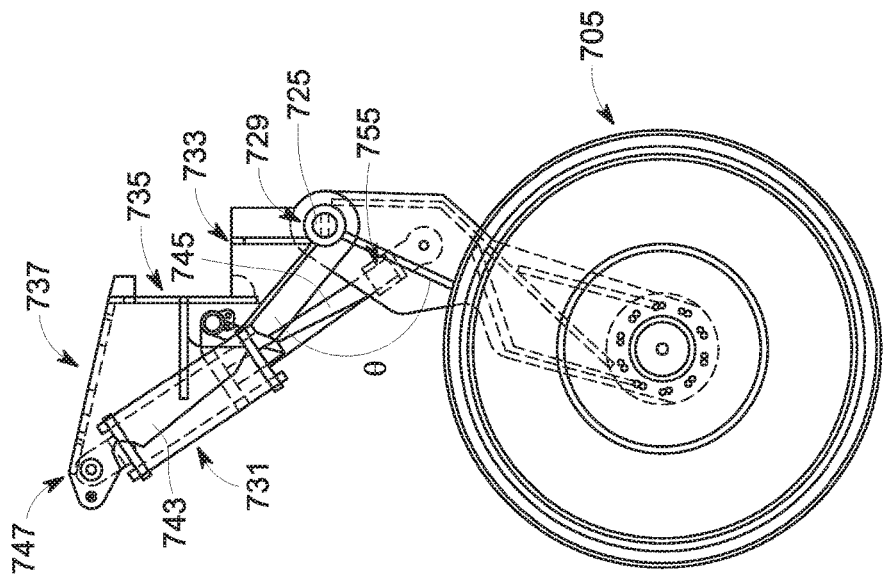
FIG. 8B is a side view of a wheel assembly as described herein.
Figure 8A:
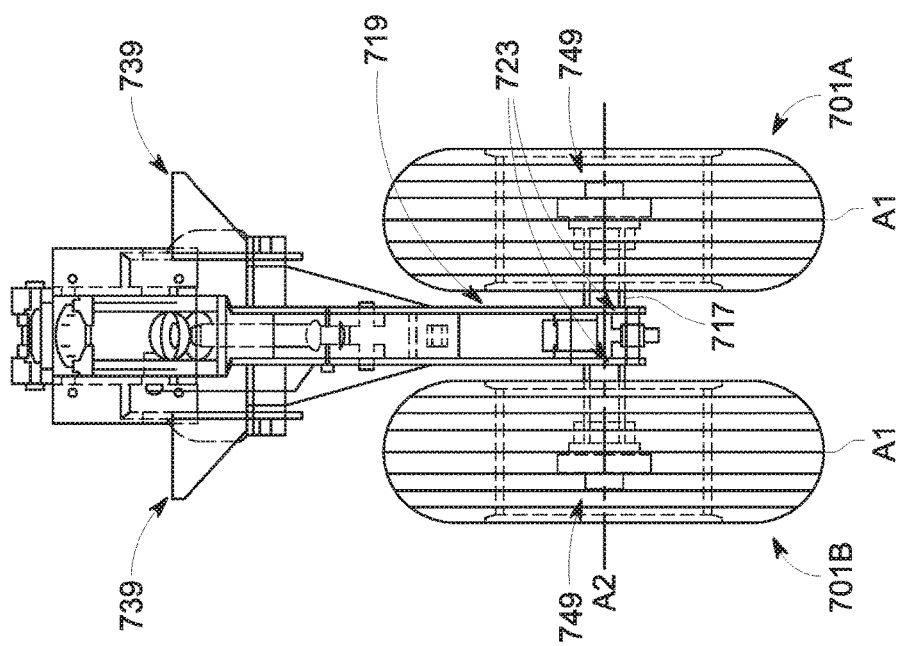
FIG. 8A is a front view of a wheel assembly as described herein.

With attention now to FIG. 8A, in some embodiments wheels 701a and 701b are mounted to axle 717 via an oscillating mount assembly 749 which allows for minimal oscillation of wheels 701a, 701b relative to axis A1. In some embodiments, minimal oscillation is defined as a maximum of 7 degrees relative to axis A1. The oscillation relative to axis A1 is advantageous in some applications as wheels 701a, 701b are permitted minimal deviation from a straight line path which provides for a "smoothing effect" as the wheels travel in a forward direction. This smoothing effect is helpful as the wheels 701a, 701b adapt to minor variations in the terrain, furrows, or seed beds.

Figure 5B:
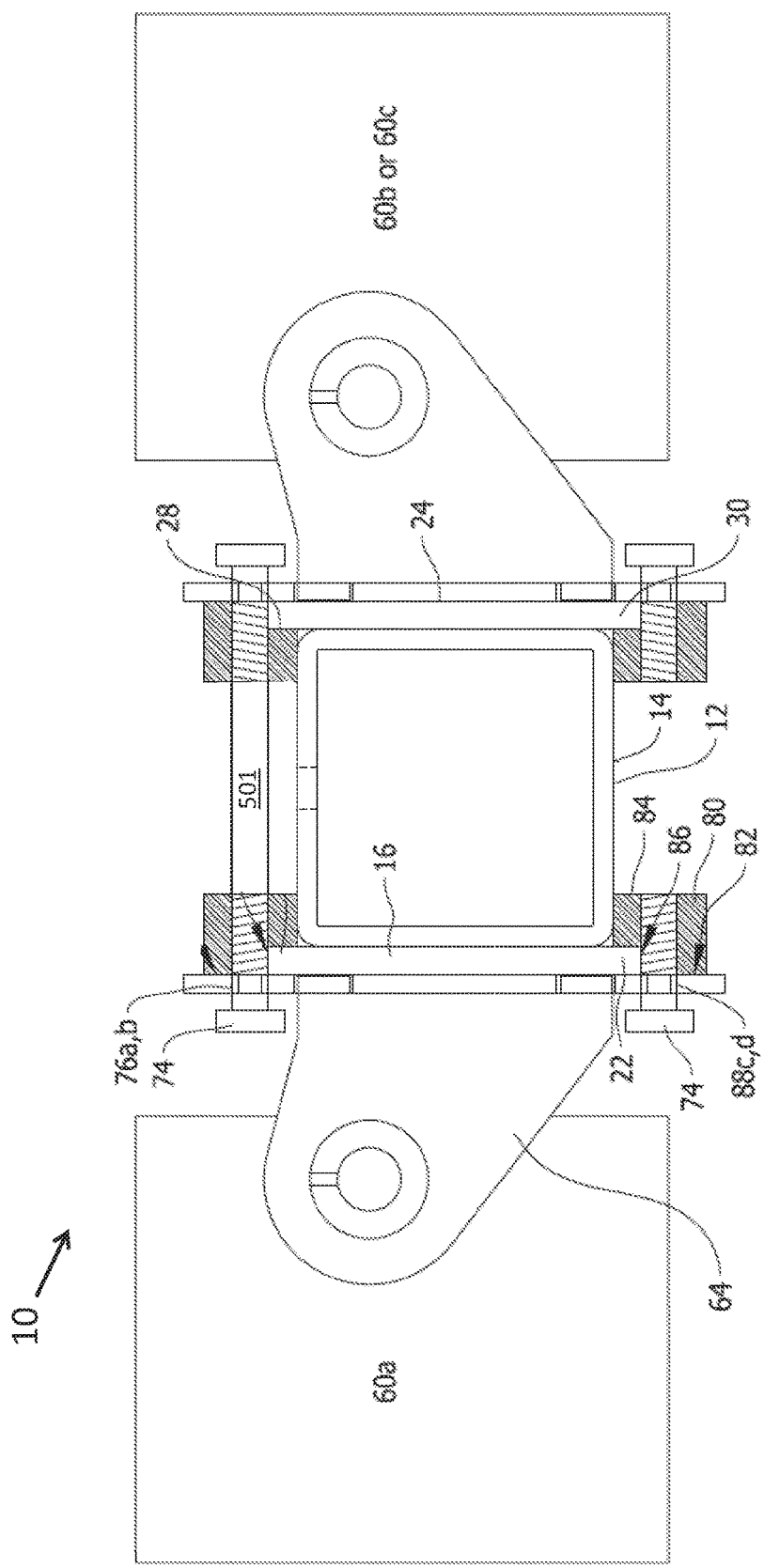

As shown in FIGS. 5A and 5B, wheel assembly 700 is connected to planter bar 12 via a mounting plate 64 in a similar manner as planter unit 60a. In FIGS. 5A and 5B, "wheels 60c" as described above can be replaced with wheel assembly 700. Thus a pair of clips and at least two threaded fasteners are used to secure a mounting bracket to second plate member 24. Mounting bracket 64 is then coupled to wheel assembly 700. In some embodiments, mounting bracket 64 is coupled to wheel assembly 700 using bolts, a pin, or some combination thereof. As described above with respect to planter unit 60, with a clear rail system the wheel assembly can thus slide along the length of planter rail 12 and be secured at any lateral position along the planter rail 12. In embodiments where second rail member 24 has a plurality of apertures 54, 56 for receiving the threaded fasteners of the mounting bracket 64, the wheel assemblies 700 can be positioned in any of numerous predetermined locations based on the positioning of the apertures 54, 56.

As shown in FIG. 5B, in some embodiments a single threaded fastener 501 is passed through both a forward mounting bracket 64 and aft mounting bracket 64 to hold those brackets together. In this configuration the wheel assembly 700 connected to the forward mounting bracket 64 and the planter unit 60 connected to the aft mounting bracket 64 are moved laterally along the planter bar 12 together.

Figure 12:
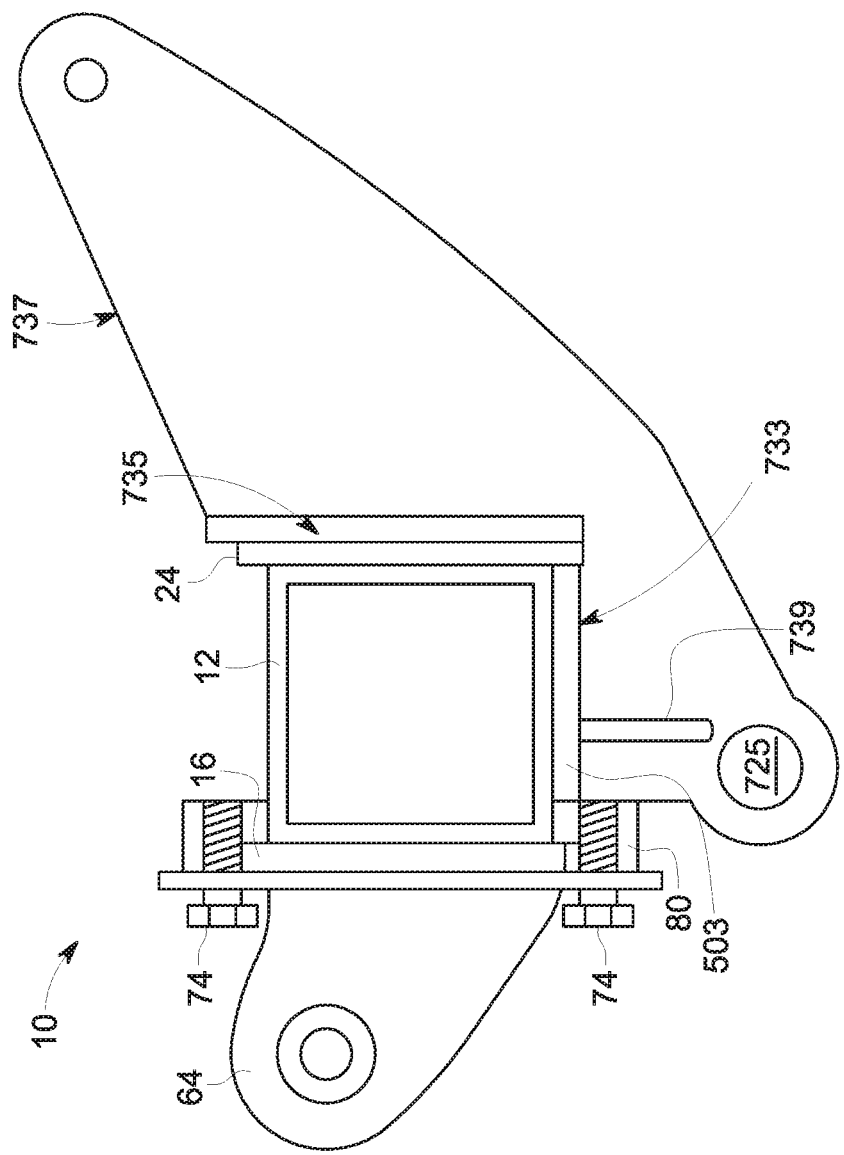
FIG. 12 is a cross-sectional view of the wheel assembly attached to the planter bar.

With attention now to FIG. 12, in some embodiments wheel assembly 700 is connected to planter bar 12 without the use of a mounting bracket 64. First mounting surface 733 is disposed adjacent to a spacer 503 which is connected to planter bar 12. Second mounting surface 735 is disposed adjacent to second plate member 24. In some embodiments, protrusions 741 extend into one of the plurality of cutouts 92 along second plate member 24. In some embodiments, threaded fasteners (not shown) are used to connect second mounting surface 735 to second plate member 24. In some embodiments, first mounting surface 733 abuts the lower fastener 80 or clip which is holding the planter unit 60 to first plate member 16.

Just as planter units 60 can be added or removed from the planter bar 12 based on the desired spacing of seed rows, wheel assemblies 700 can be added or removed from the planter bar 12 based on the desired spacing of seed rows, the overall weight of the multi-row planter system 10, the number of planter units 60 in use, and/or any number of other factors. The addition or subtraction of wheel assemblies 700 from the multi-row planter system 10 is enabled by the connection system described above involving second plate member 24. Further, the positioning of the wheel assemblies 700 is enabled by a clear rail design or by the use of a plurality of apertures 54, 56 along second plate member 24.

The presently-disclosed wheel assembly thus presents numerous advantages over the prior art. The wheel assembly 700 is of a compact, modular design which can be easily modified in position and number along a multi-row planter system as disclosed above. The wheel assembly 700 is configured to be positioned directly forward from a planter unit, thus limiting any interference of the wheels with seed distribution and evenly distributing the weight of numerous planter units and the planter bar. In embodiments where the wheel assembly 700 and planter unit 60 are connected (for example in FIG. 5B), the wheels will not travel on top of the seed bed, because the wheel assembly is located directly forward of the planter unit.

The wheel assembly 700 allows for limited vertical oscillation of the wheels 701a, 701b to account for variations in terrain during the towing of the multi-row planter system. Further, a pin connecting the rod member 719 to the connection module 721, in conjunction with a piston assembly 731 also connecting the rod member 719 to the connection module 721, allows for relative motion between the rod member 719 and connection module 721 due to variations in terrain during the towing of the multi-row planter system 10.

The reversible hubs 707 provide alternative spacing of the wheels 701a, 701b to accommodate desired seed distributions and planting patterns. A first configuration provides wheels 701a, 701b which are closer together than a second configuration which reverses the hubs 707 compared to the first configuration.

Further, wheel assemblies 700 may be added to or removed from the multi-row planter unit 10 as needed. Just as the design of the planter bar in accordance with various embodiments allows for the placement of a plurality of planter units in variable positions laterally along the planter bar, such a design also allows for the placement of a plurality of wheel assemblies in variable lateral positions. The disclosed multi-row planter system and wheel assembly together provide a system which can be configured for a wide range of applications, including and especially applications requiring various spacings between rows of seeds.

Any and all values or scales in the drawings are merely examples and are not meant to be limiting.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A multi-row planter system comprising:
   a support bar extending laterally between a first end and a second end, the support bar having a leading face and a trailing face;
   a leading plate mounted to the leading face of the support bar, wherein the leading plate comprises an upper leading rail and a lower leading rail, each leading rail comprising an exposed portion of a trailing face of the leading plate;
   a trailing plate mounted to the trailing face of the support bar;
   a plurality of planter units coupled to the trailing plate and adapted to be slidably adjustable laterally along the support bar;
   a plurality of wheel assemblies coupled to the leading plate and adapted to be slidably adjustable laterally along the support bar; and
   wherein each of the plurality of wheel assemblies are coupled to the leading plate by a mounting bracket which extends around the upper leading rail and lower leading rail.

2. The system of claim 1 wherein the leading plate extends beyond the leading face of the support bar to form the upper leading rail and the lower leading rail.

3. The system of claim 2 wherein the mounting bracket comprises a mounting plate positioned between the wheel assembly and the leading plate, an upper fastener adapted to fasten to the upper leading rail, and a lower fastener adapted to fasten to the lower leading rail.

4. The system of claim 3 wherein each of the upper fastener and lower fastener are configured to receive a threaded fastener there through such that tightening the threaded fastener serves to secure the wheel assembly to the support bar.

5. The system of claim 3 wherein the wheel assembly comprises a mounting surface adapted to engage the mounting bracket.

6. The system of claim 5 wherein the wheel assembly further comprises a piston assembly adapted to permit movement of the wheel assembly between a first folded position and a second extended position.

7. The system of claim 6 further comprising a locking tab adapted to engage the piston assembly to hold the wheel assembly in the second extended position.

8. The system of claim 1 wherein each of the plurality of wheel assemblies is positioned laterally along the support bar to be leading one of the plurality of planter units.

9. The system of claim 1, wherein the leading face of the support bar is coupled to a spacer, and a leading face of the spacer is coupled to the trailing face of the leading plate, wherein the upper leading rail extends above the spacer and the lower leading rail extends below the spacer.

10. The system of claim 9, wherein the mounting bracket comprises a mounting plate positioned between the wheel assembly and the leading plate, an upper fastener adapted to fasten to the upper leading rail, and a lower fastener adapted to fasten to the lower leading rail.

11. The system of claim 10, wherein each of the upper fastener and lower fastener are configured to receive a threaded fastener there through such that tightening the threaded fastener serves to secure the wheel assembly to the support bar.

12. The system of claim 10, wherein the wheel assembly comprises a mounting surface adapted to engage the mounting bracket.

13. The system of claim 12, wherein the wheel assembly further comprises a piston assembly adapted to permit movement of the wheel assembly between a first folded position and a second extended position.

14. The system of claim 13, further comprising a locking tab adapted to engage the piston assembly to hold the wheel assembly in the second extended position.

15. A method of configuring a multi-row planter bar, the method comprising:

Providing a multi-row planter bar comprising a support bar extending laterally between a first end and a second end, the support bar having a leading face and a trailing face, and a leading plate mounted to the leading face of the support bar, wherein the leading plate comprises an upper leading rail and a lower leading rail, each leading rail comprising an exposed portion of a trailing face of the leading plate;

Slidably positioning a first planter unit laterally along the planter bar, wherein the first planter unit is slidably adjustable laterally along the planter bar and wherein the first planter unit is coupled to a trailing plate mounted to the trailing face of the support bar via a first mounting bracket; and Slidably positioning a first wheel assembly laterally along the planter bar, wherein the first wheel assembly is slidably adjustable laterally along the planter bar and wherein the first wheel assembly is coupled to the leading plate via a second mounting bracket which extends around the upper leading rail and lower leading rail.

16. The method of claim 15 wherein the first wheel assembly is positioned directly in front of the first planter unit.

17. The method of claim 15 further comprising the steps of slidably positioning additional planter units and additional wheel assemblies laterally along the planter bar.

18. The method of claim 17 wherein the additional planter units and additional wheel assemblies are added to the planter bar in pairs, such that the planter bar has an equal number of planter units and wheel assemblies.

19. The method of claim 15 further comprising extending the wheel assembly from a first folded position to a second extended position.

20. The method of claim 19 further comprising engaging a locking tab of the first wheel assembly to secure the wheel assembly in the second extended position.

* * * * *